US008601031B2

(12) United States Patent
Moon et al.

(10) Patent No.: US 8,601,031 B2
(45) Date of Patent: *Dec. 3, 2013

(54) METHOD AND SYSTEM FOR PRESENTING NON-LINEAR CONTENT BASED ON LINEAR CONTENT METADATA

(75) Inventors: Hannah Y Moon, Boston, MA (US); D. Beau Morley, Somerville, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/334,914

(22) Filed: Dec. 22, 2011

(65) Prior Publication Data

US 2012/0143699 A1    Jun. 7, 2012

Related U.S. Application Data

(63) Continuation of application No. 11/694,915, filed on Mar. 30, 2007, now Pat. No. 8,103,707.

(51) Int. Cl.
*G06F 17/30* (2006.01)

(52) U.S. Cl.
USPC ........... 707/802; 707/722; 707/736; 707/758; 707/805; 707/708; 709/219; 725/46; 725/70; 725/135; 725/142

(58) Field of Classification Search
USPC ................. 707/913, 722, 736, 758, 802, 912; 725/46, 70, 135, 142; 709/219; 705/10
See application file for complete search history.

(56) References Cited

U.S. PATENT DOCUMENTS

| | | | | |
|---|---|---|---|---|
| 6,006,256 A * | 12/1999 | Zdepski et al. | ............... | 725/114 |
| 6,816,857 B1 * | 11/2004 | Weissman et al. | ..................... | 1/1 |
| 6,985,882 B1 * | 1/2006 | Del Sesto | ........................ | 705/37 |
| 7,031,596 B2 * | 4/2006 | Sai et al. | ........................ | 386/241 |
| 7,054,857 B2 * | 5/2006 | Cunningham et al. | ................ | 1/1 |
| 7,136,875 B2 * | 11/2006 | Anderson et al. | ..................... | 1/1 |
| 7,383,258 B2 * | 6/2008 | Harik et al. | ........................ | 1/1 |
| 7,725,829 B1 * | 5/2010 | Wong et al. | ................... | 715/726 |
| 7,739,601 B1 * | 6/2010 | Wong et al. | ................... | 715/731 |
| 7,757,171 B1 * | 7/2010 | Wong et al. | ................... | 715/719 |
| 7,805,530 B2 * | 9/2010 | Yamaguchi | ................... | 709/229 |
| 7,881,590 B2 * | 2/2011 | Yoon et al. | ..................... | 386/298 |
| 7,904,337 B2 * | 3/2011 | Morsa | ........................ | 705/14.71 |
| 7,978,177 B2 * | 7/2011 | Nash et al. | ..................... | 345/163 |
| 8,103,707 B2 * | 1/2012 | Moon et al. | ................... | 707/736 |
| 2003/0001880 A1 * | 1/2003 | Holtz et al. | ................... | 345/716 |
| 2003/0070167 A1 * | 4/2003 | Holtz et al. | ..................... | 725/32 |
| 2003/0093792 A1 * | 5/2003 | Labeeb et al. | ................... | 725/46 |
| 2003/0149574 A1 * | 8/2003 | Rudman | ........................ | 705/1 |
| 2003/0212648 A1 * | 11/2003 | Cunningham et al. | ............ | 707/1 |
| 2004/0098466 A1 * | 5/2004 | Yoon et al. | ..................... | 709/217 |

(Continued)

OTHER PUBLICATIONS

Schwartz, et al., "Learning Perl on Win32 Systems," Chapter 3, Arrays and List Data, O'Reilly Media, Inc., five pages, Aug. 8, 1997.

*Primary Examiner* — Frantz Coby

(57) ABSTRACT

A system and method may include receiving a non-linear content identifier request. The system and method may further include identifying linear content metadata associated with the non-linear content identifier request, the linear content metadata representing at least one metadata keyword. The system and method also may include identifying a relationship between the at least one metadata keyword and at least one non-linear content keyword.

23 Claims, 8 Drawing Sheets

(56) References Cited

U.S. PATENT DOCUMENTS

| | | | |
|---|---|---|---|
| 2004/0103445 A1* | 5/2004 | Yoon et al. | 725/142 |
| 2005/0235318 A1* | 10/2005 | Grauch et al. | 725/46 |
| 2006/0085408 A1* | 4/2006 | Morsa | 707/3 |
| 2007/0011702 A1* | 1/2007 | Vaysman | 725/45 |
| 2007/0011717 A1* | 1/2007 | Lauder et al. | 725/135 |
| 2007/0033531 A1* | 2/2007 | Marsh | 715/738 |
| 2007/0067420 A1* | 3/2007 | Yamaguchi | 709/219 |
| 2007/0150353 A1* | 6/2007 | Krassner et al. | 705/14 |
| 2007/0265923 A1* | 11/2007 | Krassner et al. | 705/14 |
| 2007/0266403 A1* | 11/2007 | Ou et al. | 725/46 |
| 2007/0271133 A1* | 11/2007 | McElhinney | 705/14 |
| 2007/0288662 A1* | 12/2007 | Chen | 709/247 |
| 2008/0040329 A1* | 2/2008 | Cussen et al. | 707/3 |
| 2008/0071594 A1* | 3/2008 | Morin | 705/7 |
| 2008/0167943 A1* | 7/2008 | O'Neil et al. | 705/10 |
| 2009/0265243 A1* | 10/2009 | Karassner et al. | 705/14.54 |
| 2009/0328109 A1* | 12/2009 | Pavlovskaia et al. | 725/70 |
| 2010/0049695 A2* | 2/2010 | Morsa | 707/3 |
| 2010/0158109 A1* | 6/2010 | Dahlby et al. | 375/240.03 |

* cited by examiner

300

| Campaign column 302 | Keyword column 304 | Non-Linear Content Identifier column 306 | Location column 308 | Date/Time Range column 310 | Bid Amount column 312 | Bid Rank column 314 |
|---|---|---|---|---|---|---|
| Car Company X 2007 Campaign | College, football, soccer | network address | 02143, 02144, 02166 | 1/1/07 – 1/1/08 6:00 PM – 9:00 PM | $0.05 | 3 |
| Thanksgiving Promotion | Sports Car | network address | 01234, 12345 | 11/1/07 – 12/1/07 6:00 PM – 8:00 PM | $0.03 | 6 |
| Summer Sale | Luxury Car | network address | 01234, 12345 | 9/1/07 – 12/1/08 7:00 PM – 9:00 PM | $0.10 | 1 |

| Update Campaign Field 410 | | | New Campaign Field 412 | |
|---|---|---|---|---|
| Campaign Column 402 | Keyword Column 404 | Location Column 406 | Date/Time Range Column 408 | |
| Car Company X 2007 Campaign | College, football, soccer | 02143, 02144, 02166 | 1/1/07 – 1/1/08 6:00 PM – 9:00 PM | |
| Thanksgiving Promotion | Sports Car | 01234, 12345 | 11/1/07 – 12/1/07 6:00 PM – 8:00 PM | |
| Summer Sale | Luxury Car | 01234, 12345 | 9/1/07 – 12/1/07 7:00 PM – 9:00 PM | |

METHOD AND SYSTEM FOR PRESENTING NON-LINEAR CONTENT BASED ON LINEAR CONTENT METADATA

CROSS-REFERENCE TO RELATED APPLICATIONS

This present patent application is a continuation of U.S. patent application Ser. No. 11/694,915, filed Mar. 30, 2007, entitled "Method And System For Presenting Non-Linear Content Based On Non-Linear Metadata" to Hannah Y. Moon et al. The disclosure of this priority application is hereby incorporated by reference herein in its entirety.

BACKGROUND INFORMATION

Traditionally, advertising agencies contract with a telecommunication or cable company to linearly insert advertisements within a television program. Advertisers often pay a fixed fee based on the number of advertising spots purchased and other variables such as, what time of day the advertisement is played, spot position, and whether an advertisement can be bumped by a higher-paying advertiser. Advertising using the traditional advertisement model is costly because there are a limited number of spots in a television program. Approximately 10 minutes of advertising are available during a 30 minute television program. Many advertisers are concerned about paying a high price for this type of advertising when it is uncertain whether they are reaching their target audience.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIG. 3 illustrates an advertising table in accordance with exemplary embodiments of the present disclosure;

FIG. 4 illustrates an advertisement management interface in accordance with exemplary embodiments of the present disclosure;

Figure 1:
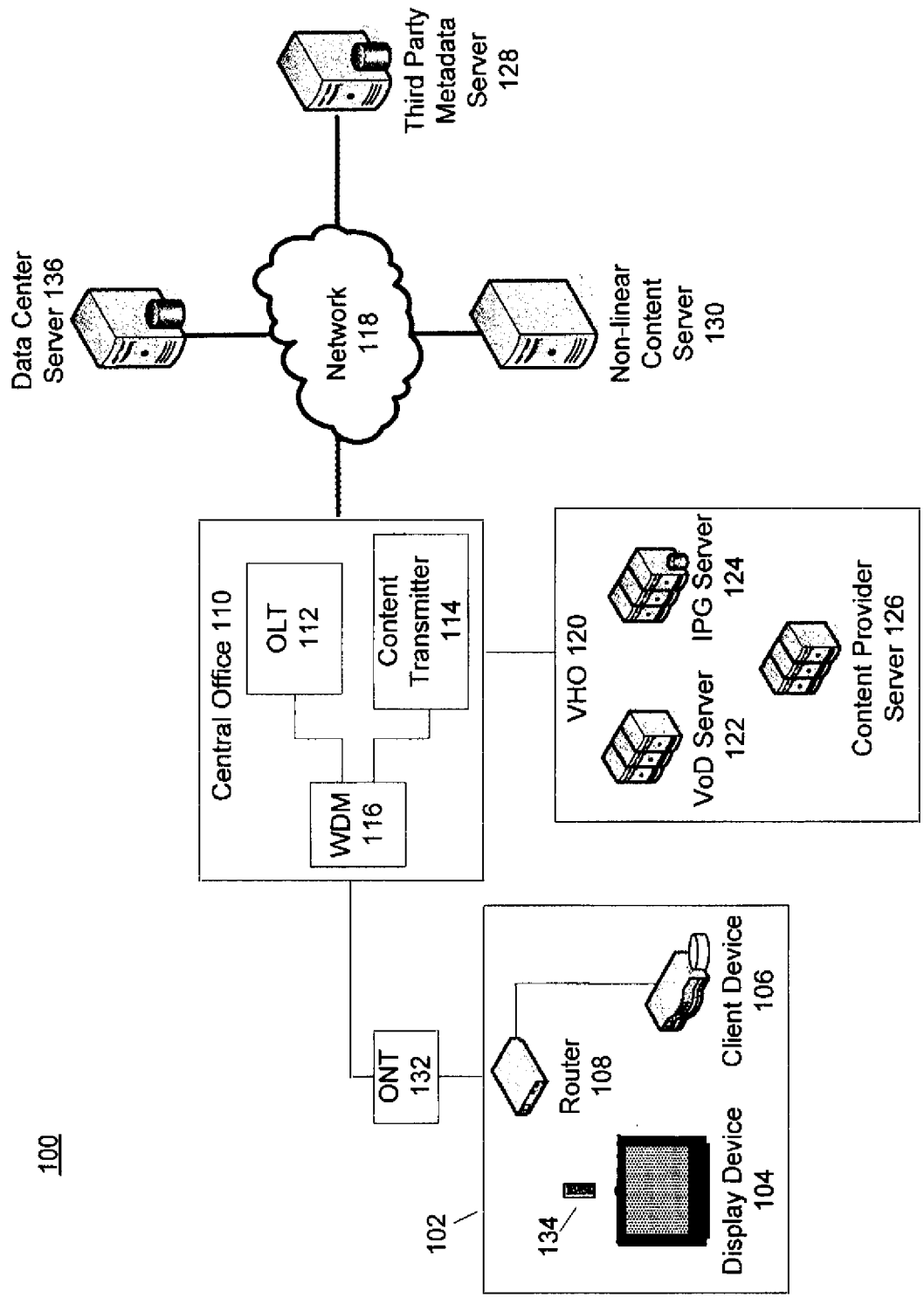
FIG. 1 illustrates a system that may implement a Pay Per Click (PPC) Advertising model to identify and present non-linear content based on linear content metadata in accordance with exemplary embodiments of the present disclosure.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method in accordance with exemplary embodiments of the present disclosure may include receiving a non-linear content identifier request. The system and method may further include identifying linear content metadata associated with the non-linear content identifier request, the linear content metadata representing at least one metadata keyword. The system and method also may include identifying a relationship between the at least one metadata keyword and a non-linear content keyword.

The description below describes servers, computers, terminals, client devices, and other computing devices that may include one or more modules, some of which are explicitly depicted in the figures, others are not. As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another (e.g., servers). Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, computers, terminals, client devices, etc.) separately. The functions described as being performed at various components may be performed at other components, and the various components may be combined and/or separated. Other modifications also may be made.

Content as used herein may refer to multimedia that uses, for example, one or more of text, audio, graphics, and video. Generally, content may be divided into two categories: linear content and non-linear content. Linear content may refer to content that is displayable in a predefined sequence, which is determined before a broadcast time of the content. An example of linear content is a television program having commercial advertisements inserted therein in a defined sequence before the program is broadcast. In another example, a television program may include multiple ten, fifteen, or thirty second commercial segments that sequentially follow one another. Non-linear content may refer to content, which is associated with linear content, that involves viewer interaction to access during or after a display of the linear content. The non-linear content may include, for example, audio, video, music, interactive content, time-shifted content, photos, websites, banners, a webpage, recipes, instructions, advertisements, long advertisements (e.g., longer than the traditional 30 second spots used in television programs), text, interactive advertisements, Video on Demand (VoD) content, Video on Demand (VoD) advertising, user generated content, broadband content, advanced advertisements, additional content that the viewer selects to view, and/or combinations thereof. The non-linear content may include, for example, multimedia for advertising a product and/or service or may include multimedia for describing a topic.

A system in accordance with exemplary embodiments of the present disclosure may implement a Pay Per Click (PPC) Advertising model to identify and present non-linear content based on linear content metadata. The linear content metadata may contain a description of the linear content being broadcast. The linear content metadata may be, for example, text file including at least one metadata keyword that describes the linear content. The metadata keyword may be, for example, a word in a language (e.g., English), a word phrase, a symbol sequence, a show title, a name, an actor, a director, a genre, a rating of the linear content (e.g., General, Parental Guidance, etc.), a category, or other information that may describe the linear content. The symbol sequence may be, for example, a number sequence, a letter sequence that may or may not correspond to a word (e.g., a word in the English language), a number and/or letter sequence, or other symbols that may represent a concept. The description provided by the linear content metadata may be displayed in a graphical user interface to inform a viewer about the linear content. A telecommunications provider may sell advertising based on non-linear content keywords. The non-linear content keywords may be a word in a language (e.g., English), a word phrase, a symbol sequence, a show title, a name, an actor, a director, a genre, a rating of the linear content (e.g., General, Parental Guidance, etc.), a category, or other information that the advertiser may associate with a product and/or service. The symbol sequence may be, for example, a number sequence, a letter sequence that may or may not correspond to a word (e.g., a word in the English language), a number and/or letter sequence, or other symbols that may represent a concept.

The system may identify a relationship between at least one metadata keyword and at least one non-linear content keyword advertisers have bid on. The relationship may indicate a complete or partial match between the at least one metadata keyword and at least one non-linear content keyword. The system may identify which non-linear content (e.g., advertisement) is available for display to the viewer based on the relationship. For example, the system may apply a matching algorithm to determine a bidding-to-linear content metadata relationship to match at least one metadata keyword with at least one non-linear content keyword. The system may present non-linear content identifier fields representing available non-linear content based on the identified relationship.

Once the system has identified one or more partial and/or complete matches between at least one non-linear content keyword and at least one metadata keyword, the system may filter the matching non-linear content keyword(s) based on filtering parameters. Filtering parameters may filter the non-linear content keyword based on, for example, a time slot, a location, a date range, a rating of the linear content, or other information that the advertiser may specify to associate the non-linear content with linear content. The filtered non-linear content keyword may be associated with non-linear content identifiers. The system may use the non-linear content identifiers to retrieve non-linear content.

Once the system has identified one or more non-linear content identifiers associated with the filtered matching non-linear content keyword, the system may send to a client device a non-linear content identifier response including the one or more non-linear content identifiers. The client device may display non-linear content identifier fields that are associated with the non-linear content identifiers. For example, the client device may be a digital video recorder, a set top box, a converter, or other device capable of receiving and processing a content signal (e.g., linear or non-linear.) to cause display of linear and/or non-linear content at a display device. The viewer may select one of the non-linear content identifier fields to retrieve and display the associated non-linear content. When the viewer requests to access the non-linear content, the telecommunications provider may collect revenue by charging the advertiser for display of the non-linear content to the viewer. The telecommunications provider may be, for example, a cable company, a satellite provider, an Internet company, a telephone company, etc.

In an exemplary embodiment, a viewer may be watching a television program broadcast by a linear content provider. The television program may be associated with linear content metadata that describes the television program. The linear content metadata may include a text file including the text "Bob interviews guest Mary Smith on nutrition and health." Each of the words in the text file may be a separate metadata keyword. The system in accordance with exemplary embodiments of the present disclosure may match at least one of the metadata keywords with at least one non-linear content keyword advertisers have bid on. Based on the matches, the system may display non-linear content identifier fields associated with non-linear content identifiers, which may be used to retrieve non-linear content associated with the advertisers. For example, the system may identify a match between a metadata keyword "nutrition" and a non-linear content keyword "nutrition" that the advertiser has bid on. The system may retrieve a non-linear content identifier (e.g., link to an advertisement) associated with the non-linear content keyword based on the match. The system may display to the viewer a non-linear content identifier field associated with the non-linear content identifier. The viewer may select the non-linear content identifier field to retrieve the non-linear content (e.g., advertisement) of the advertiser for display at a display device, as discussed below in further detail.

FIG. 1 illustrates a system that may implement a Pay Per Click (PPC) Advertising model to identify and present non-linear content based on linear content metadata in accordance with exemplary embodiments of the present disclosure. The system 100 is exemplary, and generally any system where a client device may receive broadcast linear content from a linear content provider and may exchange digital data with a data center server and/or a non-linear content server to request and receive non-linear content may be used. The system 100 may include a subscriber location 102, an optical network termination (ONT) 132, a central office 110, a network 118, a video head office (VHO) 120, a third party metadata server 128, a non-linear content server 130, and a data center server 136.

The video head office (VHO) 120 may communicate content signals (linear and non-linear) to the subscriber location 102 via the central office 110 for display at a display device 104. The content signals may be signals for causing display of video, audio, text, etc. For example, the content signals may be cable television and the viewer may select a channel for viewing a particular television program. In another example, the content signals may be 64 point signal constellation Quadrature Amplitude Modulation (QAM) digital cable signals, 256 point signal constellation QAM digital cable signals, cable signals in other analog or digital cable television formats, as are well known.

The video head office (VHO) 120 may include a Video on Demand (VoD) Server 122, a Content Guide (CO) server 124, and a content provider server 126. The Video on Demand (VoD) Server 122 may permit a viewer to select linear content for viewing at a time of the viewer's choice, as is well known. The Content Guide (CG) server 124 may provide data for use in a graphical user interface at the display device 104 to permit the viewer to identify and select desired linear content for viewing (e.g., menu guide), as is well known. The content provider server 126 may generate the content signals useable to display the linear content at a display device 104.

In various exemplary embodiments, the central office 110 may communicate using a passive optical network. Other networks instead of or in addition to a passive optical network also may be used. In an exemplary embodiment, the central office 110 may communicate optical signals to the optical networking termination (ONT) 132. The optical signals may include digital data and/or linear content (e.g., video). The central office 110 may include a wave-division multiplexer to combine signals received from the video head office (VHO) 120 and from the network 118 for transport to the optical networking termination (ONT) 132. The passive optical network may, for example, comply with the International Telecommunication Union Telecommunication Standard (ITU-T) Recommendation G.983.1 titled "Broadband Optical Access Systems based on Passive Optical Networks (PON)," January 2005, the contents of which are incorporated herein by reference in its entirety. Downstream digital data optical signals transmitted from the wavelength division multiplexer (WDM) 116 to the optical networking termination (ONT) 132 may use a 1490 nanometer (nm) wavelength. A radio frequency optical video signal transmitted from the wavelength division multiplexer (WDM) 116 to the optical networking termination (ONT) 132 may use a 1550 nanometer (nm) wavelength. Upstream digital data optical signals transmitted from the optical networking termination (ONT) 132 to the wavelength division multiplexer (WDM) 116 may use a 1310 nanometer (nm) wavelength. The radio frequency optical video signal may comply with the American National Standard Society of Cable Telecommunication Engineers standard ANSI/SCTE 07 2006 titled "Digital Transmission Standard for Cable Television," the contents of which are incorporated herein by reference in its entirety. Other optical and non-optical communication systems, networks, and standards also may be used.

The wavelength division multiplexer (WDM) 116 may multiplex the downstream digital data optical signals from the optical line terminal (OLT) 112 with the radio frequency video signal from the content transmitter 114 for transmission to the optical networking termination (ONT) 132. The optical line terminal (OLT) 112 may communicate digital data to and from the network 118. The wavelength division multiplexer 116 may wavelength division multiplex the 1490 nanometer (nm) wavelength of the downstream digital data optical signals and the 1550 nanometer (nm) wavelength of the radio frequency optical video signal for transmission to the optical networking termination (ONT) 132. The wavelength division multiplexer (WDM) 116 also may demultiplex the 1310 nanometer (nm) wavelength upstream digital data signals received from the optical networking termination (ONT) 132 and may forward the upstream digital data signals to the video head office (VHO) 120 and/or to the network 118. The optical networking termination (ONT) 132 may provide the optical signals to the subscriber location 102. For example, the optical networking termination (ONT) 132 may convert the radio frequency optical video signal and the downstream digital data optical signals to electrical radio frequency signals for transmission via coaxial wiring of the subscriber location 102. The subscriber location 102 also may include optical fiber instead of coaxial wiring and may not involve an optical to electrical conversion.

A router 108 may receive and forward the electrical radio frequency signals to a client device 106. For example, the client device 106 may be coupled to an Ethernet port of the router 108. Optionally, the router 108 may be omitted and the client device 106 may be connected to the optical networking termination (ONT) 132 and a multimedia over coaxial (MOCA) cable technology may be used for data communication. The client device 106 may process and/or convert the electrical radio frequency signals for display at the display device 104 to a viewer. The display device 104 may be a television set, for example. The display device 104 also may be other devices capable for displaying video, such as, but not limited to, a computer monitor. The client device 106 and the display device 104 also may be a single device, instead of two separate devices, as shown. The display device 104 may have an associated input device 134. The input device 134 may be, for example, a remote control, a keyboard, or other device that may receive and communicate input from a viewer. The input device 134 also may be integrated with the client device 106 and/or the display device 104.

The client device 106 may establish a video communication session for receiving content from the video head office (VHO) 120 and may establish a data communication session for communicating with the data center server 136 and/or the non-linear content server 130. The video communication session may communicate video content signals in an analog and/or digital format. For example, the video communication session may transport radio frequency 64 point signal constellation Quadrature Amplitude Modulation (QAM) digital cable signals, 256 point signal constellation QAM digital cable signals, or may transport cable signals in other analog or digital cable television formats, as are well known. The video communication session also may transport packetized video. The data communication session may be used to communicate digital data, such as packets, cells, or other data types. For example, the data communication session may be an Internet Protocol channel for exchanging Internet Protocol packets. The data communication session may be used to permit the client device 106, the non-linear content server 130, and the data center server 136 to communicate, as will be discussed in further detail below. The viewer may, using an input device 134, select to view particular linear content by communicating a selection request signal to the client device 106 to tune to a particular channel broadcast by the video head office (VHO) 120.

Figure 10:
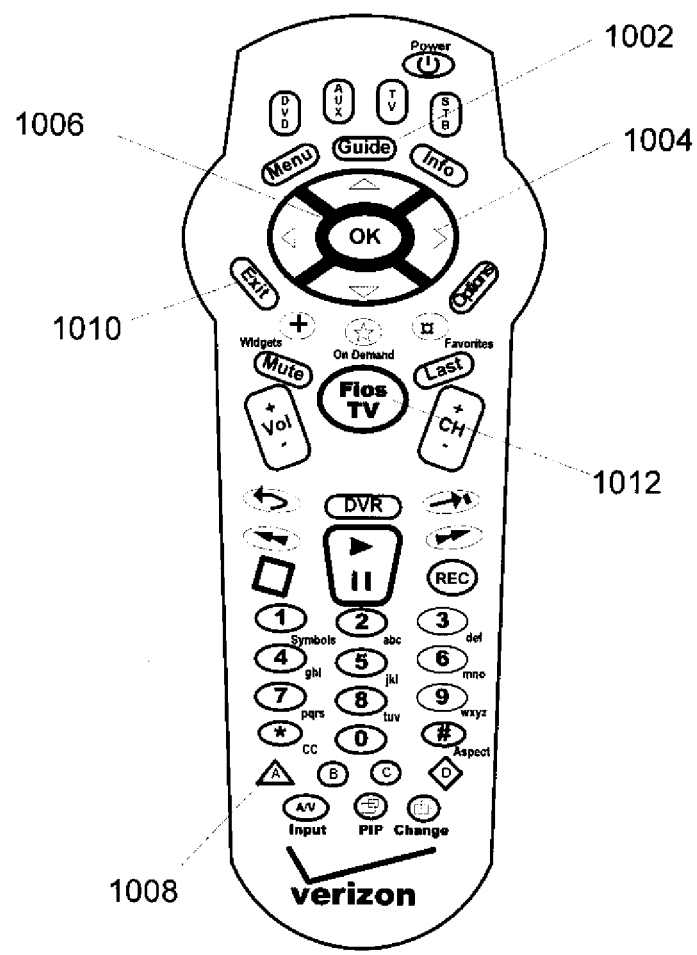
FIG. 10 illustrates an input device in accordance with exemplary embodiments of the present disclosure.

FIG. 10 illustrates an input device in accordance with exemplary embodiments of the present disclosure. The input device 134 may receive inputs from a viewer to instruct the client device 106 to perform various functions. The commands on the input device 134 may be, for example, an exit key 1010, a display graphical user interface key 1012, one or more navigation key 1004, a selection key 1006, etc. The exit key 1010 may instruct the client device 106 to exit out of a display of a graphical user interface, the display graphical user interface key 1012 may instruct the client device 106 to cause the display of a graphical user interface, the one or more navigation keys 1004 may be arrow keys for scrolling through and highlighting various fields of a graphical user interface, and the selection key 1006 may select a particular field within a graphical user interface. It is noted that the input device 134 is depicted as being a remote control with softkeys that may be pressed by a user. The input device 134 also may include a touchscreen where the viewer may touch an icon on a display (e.g., on display device 104). Other input devices also may be used, such as, but not limited to, voice activated, gesture activated, or other input devices that may receive input from a viewer. Depressing one of the keys, for example, may instruct the input device 134 to generate an output signal encoded with a command based on the pressed key.

When the client device 106 receives the output signal from the input device 134 that selects a particular linear content, the client device 106 may communicate a non-linear content identifier request to the data center server 136 associated with the selected linear content. For example, the viewer may use a remote control to change a channel to view a different television program. The non-linear content identifier request may include a linear content identifier associated with the selected linear content and/or may include the linear content metadata of the selected linear content. The non-linear content identifier request also may include location data (e.g., zip code, subscriber location address, etc.) to identify the subscriber location.

Each content identifier (non-linear and linear) may be, for example, a letter sequence, a number sequence, a symbol sequence, other information useable to uniquely identify content, and/or combinations thereof. The linear content identifier may be assigned by a broadcaster to distinguish linear content from other linear content. For example, the linear content identifier may be a number and letter sequence "XR234CWB—Episode 27" unique to this television program. The non-linear content server 130 may assign non-linear content identifiers to the uploaded non-linear content. For example, the non-linear content identifier may be a number and letter sequence "MRXE93—advertisement 77" unique to an advertisement.

The data center server 136 may receive and process the non-linear content identifier request to retrieve linear content metadata associated with the linear content identifier. The linear content metadata may be stored at the data center server 136, or may be retrieved from the third party metadata server 128. Also, if the non-linear content identifier request includes the linear content metadata, the data center server 136 may process the linear content metadata included in the non-linear content identifier request without retrieving the linear content metadata from another source. The data center server 136 may generate a non-linear content identifier response based on the linear content metadata, as will be discussed in further detail below.

Also, instead of the client device 106 communicating a non-linear content identifier request each time the viewer selects to view a different linear content (e.g., changes a television channel), the data center server 136 may process the linear content metadata associated with some or all of the linear content and may forward a non-linear content identifier response to the client device 106 at predetermined intervals. In this exemplary embodiment, the non-linear content identifier response may include the non-linear content identifiers associated with some or all of the linear content being broadcast over a given time period (e.g., second, minute, hour, days week, month, etc.).

The third party metadata server 128, the non-linear content server 130, the data center server 136, and the central office 110 may communicate with one another via the network 118. The third party metadata server 128, the non-linear content server 130, the data center server 136 also may be implemented at a single server. The network 118 may be a wired network and/or a wireless network, and may communicate using known protocols, such as, but not limited to, circuit-switched protocols (e.g. asynchronous transfer mode (ATM)) and/or packet switched protocols (e.g., Internet Protocol (IP)). Other protocols also may be used and conversions between one or more protocols may occur, both of which are well known.

The third party metadata server 128 may store a plurality of linear content identifiers to uniquely identify linear content and linear content metadata for each linear content. Each of the linear content identifiers may be associated with linear content previously broadcast, linear content currently being broadcast, or linear content that may be broadcast at some future time. The third party metadata server 128 may periodically communicate a linear content metadata message including linear content metadata to the data center server 136. The linear content metadata message may include one or more linear content identifiers for each linear content being broadcast during the time period, and optionally previous and/or further broadcasts, and linear content metadata associated with each linear content identifier. The linear content metadata message also may include updates to linear content metadata. Thus, the linear content metadata may be static or dynamic (i.e., may change in real-time). Companies such as FYI Television, Inc. and TVN Entertainment provide linear content metadata that includes brief descriptions of television programs for use in an interactive programming guide (IPG). The linear content metadata may include metadata keywords that provide a description of the linear content. For example, each metadata keyword may be one of the words in the sentence "Today Bob interviews guest Jacob Jones about his new cookbook on American cuisine."

The third party metadata server 128 may send the linear content metadata message to the data center server 136 and/or to the client device 106. Also, the Content Guide (CG) server 124 may broadcast the linear content identifiers and the linear content metadata along with the content signals to the client device 106 instead of the third party metadata server 128. The data center server 136 may use the linear content metadata message to identify a relationship (e.g., partial match, complete match) between the metadata keywords and the non-linear content keywords advertisers have bid on, as will be discussed in further detail below. The relationship may be used to present non-linear content stored at the non-linear content server 130 based the linear content metadata.

The non-linear content server 130 may provide an interface for a telecommunications provider to accept bids on non-linear content keywords and to store non-linear content received from one or more advertisers. The non-linear content server 130 may be, for example, an Intranet Web Server having an Advertisement Server Interface. The non-linear content server 130 may permit advertisers to place bids on non-linear content keywords. The non-linear content keywords may be a single word (e.g., television, computer, skirt, etc.), a word phrase (e.g., "used truck," "Fourth of July sale," etc.), a number sequence (e.g., 911), a letter sequence (e.g., XRLI), a number and letter sequence (e.g., XR421), a symbol sequence (e.g., $%^%), a rating of the content (e.g., Parental Guidance or "PG"), a show title, a name, an actor, a director, a category, combinations thereof, and/or other information the advertisers believes is relevant to a product and/or service, and/or to the types of linear content on which the advertiser desires to advertise.

An advertiser may select one or more non-linear content keywords that the advertiser believes are relevant to the product and/or service the advertiser is advertising. The non-linear content server 130 also may suggest related non-linear content keywords. The one or more advertisers with the highest bid or bids on a particular non-linear content keyword may have a non-linear content identifier field appear in an advertising display graphical user interface presented to the viewer at the display device 104, as discussed in further detail below. The advertising display graphical user interface may display all non-linear content identifier fields associated with non-linear Content keywords advertisers have bid on, or may display non-linear content identifier fields associated with a bid amount of at least a minimum bid amount. The non-linear content server 130 may associate the non-linear content keywords with non-linear content uploaded from the advertiser.

The advertisers may upload the non-linear content to the non-linear content server 130 for storage. Loading non-linear content onto the non-linear content server 130 also may be referred to as ingesting. The non-linear content may be, for example, video, audio, text, interactive advertisements, Video on Demand (VoD) long advertisements, banner advertisements, etc., or other manners for advertising a product and/or service, as discussed above. For example, an advertiser who has purchased a linear television commercial for a particular program, may desire to also provide non-linear content that directs a viewer to a website of the advertiser. In a further example, a car company may purchase a linear 30 second advertisement segment in a particular television program, and also may purchase a non-linear content advertisement that includes a link to the car company's webpage. The non-linear content may be non-linearly associated with the linear content so that the viewer may view the non-linear content outside of typical advertisements linearly inserted into the broadcast linear content. The advertisers may bid on non-linear content keywords and upload non-linear content using an advertiser input graphical user interface.

Figure 2:
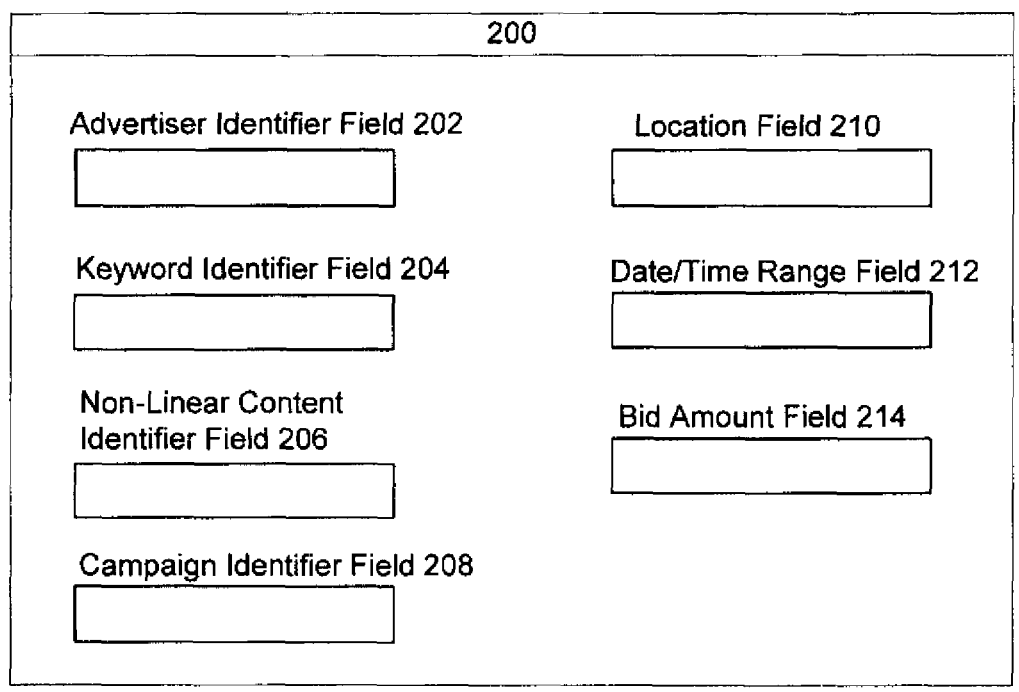
FIG. 2 illustrates an advertiser input graphical user interface in accordance with exemplary embodiments of the present disclosure.

FIG. 2 illustrates an advertiser input graphical user interface in accordance with exemplary embodiments of the present disclosure. An advertiser may access the advertiser input graphical user interface 200 to bid on non-linear content keywords and to upload non-linear content to the non-linear content server 130. The advertiser may use a computer (not shown), for example, to access the advertiser input graphical user interface 200, which may be, for example, presented in a website, via the network 118. The advertiser input graphical user interface 200 may include an advertiser identifier field 202, a keyword identifier field 204, a non-linear content identifier field 206, a campaign identifier field 208, a location field 210, a date/time range field 212, and a bid amount field 214.

In the advertiser identifier field 202, the advertiser may input information to uniquely identify the advertiser. For example, the advertiser may enter a name of the advertiser's company.

In the keyword identifier field 204, the advertiser may input a non-linear content keyword on which the advertiser desires to bid. For example, an organic grocery store may bid on the non-linear content keywords "organic," "health," and "diet."

In the non-linear content identifier field 206, the advertiser may input non-linear content and a non-linear content identifier. The non-linear content identifier may be, for example, a unique a letter sequence, a number sequence, a symbol sequence, other information useable to uniquely identify non-linear content, and/or combinations thereof. The non-linear content server 130 also may assign the non-linear content identifier to the non-linear content. The non-linear content identifier also may include a network address to identify a storage location of the associated non-linear content. For example, the advertiser may input a link to a website containing an advertisement video stored at the non-linear content server 130, or stored at another webserver. In another example, the non-linear content identifier may identify a storage location on the non-linear content server 130 where the associated non-linear content is stored.

In the campaign identifier field 208, the advertiser may input campaign information to uniquely identify an advertising campaign. For example, a car company may purchase multiple non-linear content keywords to advertise a latest model year car. The advertiser may input a name or other information that the advertiser may use to track their advertising campaigns.

In the location field 210, the advertiser may input information to identify a geographical location where the non-linear content may be displayed. For example, the advertiser may be a small business in a town in southern Wisconsin, and may wish to advertise to consumers in southern Wisconsin. The advertiser may input, for example, a name of a continent, a country, a state, a town, a zip code, a neighborhood, a street name, an exact address, or other geographic information to identify the geographic location where the advertiser desires to advertise.

In the date/time range field 212, the advertiser may input information to select a time range to identify the times when the advertiser desires to advertise and a date range to identify the dates when the advertiser wishes to advertise. For example, a restaurant may desire to advertise between 6:00 PM and 9:00 PM between October 1 and March 1.

In the bid amount field 214, the advertiser may input a bid amount for a non-linear content keyword. For example, a grocery store may input a bid amount of $0.05 for the non-linear content keyword "grocery." Each time a viewer selects to retrieve the non-linear content associated with the advertiser, the non-linear content server 130 may charge the bid amount to the advertiser's account (i.e., Pay Per Click). The advertiser also may specify a higher bid for a non-linear content keyword in a first time slot, and a lower bid for the same non-linear content keyword in a different time slot. For example, the advertiser may submit a higher bid during prime time as opposed to other time slots. The non-linear content server 130 also may display a set fee for advertising during a particular time slot, within a certain location (e.g., zip code), during a particular content, or based on other information deemed of value by the telecommunications provider. The non-linear content server 130 also may inform the advertisers about viewers who have retrieved non-linear content associated with a particular non-linear content keyword based on a user profile associated with the viewer, as discussed in further detail below. Identifying viewers interested in non-linear content associated with a particular non-linear content keyword may permit the advertisers to submit higher bids to target viewers known to be interested in topics associated with a particular non-linear content keyword.

The non-linear content server 130 may generate a metrics report to inform each advertiser about the viewers who have selected to view the advertiser's non-linear content. The metrics report may identify an aggregate number of viewers who have selected to view non-linear content and also may identify the geographic locations of these viewers. The metrics report may be generated electronically or in a physical form. In an exemplary embodiment, the metrics report may indicate a number of views of the non-linear content, charges associated with the number of views, a number of viewers by viewer location information. The number of views of the non-linear content may indicate a total number of how many times the non-linear content server 130 sent the one or more of a particular advertiser's non-linear content to one or more client devices 106. The charges associated with the number of views may represent the number of views multiplied by the bid amount of the metadata keyword that the advertiser bid on. The number of viewers by viewer location information may indicate the different geographic locations (e.g., by street, by zip code, by city, by state, by region, by country, etc.) of the viewers requesting to access the non-linear content. Thus, the metrics report may provide the advertiser with meaningful information about their potential consumers. When an advertiser submits information in the advertiser input graphical user interface 200, the non-linear content server 130 may create an advertising table for each advertiser to store the input information.

FIG. 3 illustrates an advertising table in accordance with exemplary embodiments of the present disclosure. The advertising table 300 may include a campaign column 302, a keyword column 304, a non-linear content identifier column 306, a location column 308, a date/time range column 310, a bid amount column 312, and a bid rank column 314. The data stored in the columns 302-312 may correspond to the information entered in the advertiser input graphical user interface 200, as described above. The bid rank column 314 may correspond to data received from the data center server 136 indicating the rank of the advertiser's bid amount relative to bid amounts from other advertisers on one or more non-linear content keywords, as will be described in further detail below. It is noted that the advertising table 300 may include greater or fewer rows depending on the number of advertising campaigns associated with a particular advertiser. Additionally, data structures other than a table may be used.

The following describes an exemplary advertising table 300 associated with an advertiser. For example, a first row of the advertising table 300 may include "Car Company X 2007 campaign" in the campaign column 302, non-linear content keywords "college," "football," and "soccer" in the keyword column 304, a network address (e.g., Internet Protocol address, etc.) identifying a storage location of non-linear content on the non-linear content server 130 in the non-linear content identifier column 306, zip codes "01243," "02144," and "02166" in the location column 308, a date range from "Jan. 1, 2007-Jan. 1, 2008" and a time range of "6:00 PM-9:00 PM" in the date/time range column 310, "$0.05" in the bid amount column 312, and "3" in the bid rank column 314. A second row of the advertising table 300 may include "Thanksgiving Promotion" in the campaign column 302, the non-linear content keyword phrase "sports car" in the keyword column 304, a network address (e.g., Internet Protocol address, etc.) identifying a storage location of non-linear content on the non-linear content server 130 in the non-linear content identifier column 306, zip codes "01234" and "12345" in the location column 308, a date range from "Nov. 1, 2007-Dec. 1, 2007" and a time range of "6:00 PM-8:00 PM" in the date/time range column 310, "$0.03" in the bid amount column 312, and "6" in the bid rank column 314. A third row of the advertising table 300 may include "Summer Sale" in the campaign column 302, the non-linear content keyword phrase "luxury car" in the keyword column 304, a network address (e.g., Internet Protocol address, etc.) identifying a storage location of non-linear content on the non-linear content server 130 in the non-linear content identifier column 306, zip codes "01234" and "12345" in the location column 308, a date range from "Sep. 1, 2007-Dec. 1, 2007" and a time range of "7:00 PM-9:00 PM" in the date/time range column 310, "$0.10" in the bid amount column 312, and "1" in the bid rank column 314. It is noted that the above description of entries in the address table 300 is exemplary. The number of rows and the information included in the address table 300 may be modified. The advertiser may access an advertisement management interface to review the advertiser's campaigns.

FIG. 4 illustrates an advertisement management interface in accordance with exemplary embodiments of the present disclosure. For example, the advertisement management interface may be an Adtool interface. The advertiser may use the advertisement management interface 400 to manage the advertiser's campaigns. The advertisement management interface 400 may permit the advertiser to easily manage advertising campaigns. The advertisement management interface 400 may include a campaign column 402, a keyword column 404, a location column 406, and a date/time range column 408, each of which may include the data from the corresponding column of the advertising table 300. The advertisement management interface 400 also may display other information from the advertising table 300. The advertisement management interface 400 additionally may include an update campaign field 410 and a new campaign field 412. The advertiser may select the update campaign field 410 to modify, add to, delete, etc., an existing campaign. The advertiser may select the new campaign field 412 to bring up the advertiser input graphical user interface 200 to create a new campaign. The non-linear content server 130 may communicate an advertiser message that includes some or all of the information stored in the address table 300 to the data center server 136 for use in determining a relationship between non-linear content keywords and metadata keywords. The advertiser message may be sent as frequently as every time the advertising table 300 is updated by one of the advertisers, or may be updated at other intervals, such as every minute, hour, day, or other time intervals. The advertiser message have be sent at varying frequencies in order to prevent from overloading the data center server 136.

Figure 5:
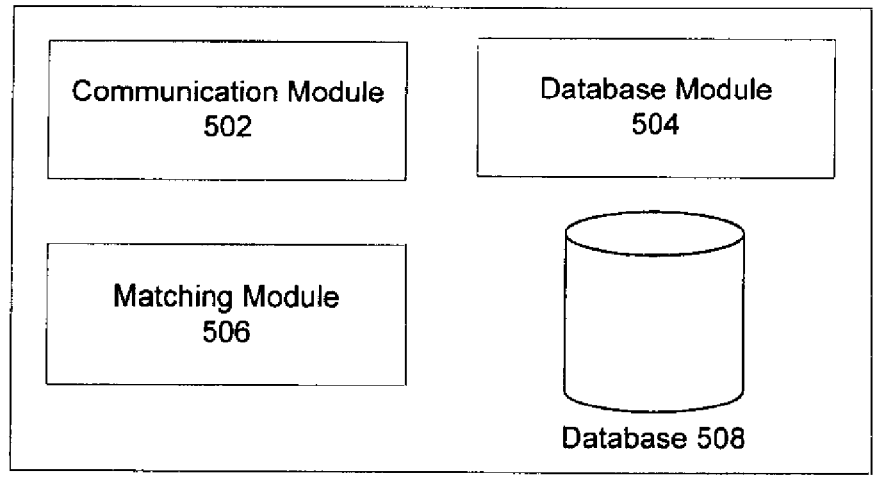
FIG. 5 illustrates a data center server in accordance with exemplary embodiments of the present disclosure.

FIG. 5 illustrates a data center server in accordance with exemplary embodiments of the present disclosure. The data center server 136 may process and may store the information included in the advertiser message. The data center server 136 may identify a relationship (e.g., complete match, partial match) between a metadata keyword and a non-linear content keyword. The data center server 136 may send non-linear content identifiers associated with partial or complete matching non-linear content keywords to client device 106 in a non-linear content identifier response for presentation to the viewer.

The data center server 136 may include a communication module 502, a database module 504, a matching module 506, and a database 508. The communication module 502 may exchange digital data signals via the network 118. The digital data signals may be packets (e.g., Internet Protocol packets), cells (e.g., Asynchronous Transfer Mode (ATM) cells), or other digital data types. The communication module 502 may forward the received digital data signals to the database module 504 and/or the matching module 506.

The database module 504 may access and store data in the database 508. The database module 504 may store the linear content metadata messages received from the third party metadata server 128 and the advertiser messages received from the non-linear content server 130.

The matching module 506 may identify a relationship between the metadata keyword and one or more non-linear content keywords. When a viewer selects to view particular linear content, the client device 106 may communicate to the data center server 136 a non-linear content identifier request. The non-linear content identifier request may include a linear content identifier of the selected linear content or may include the linear content metadata of the selected linear content. The matching module 506 may identify linear content metadata based on the non-linear content identifier request. The matching module 506 may identify the linear content metadata based on the linear content metadata being included within the non-linear content identifier request, or may identify the linear content metadata using the linear content identifier included in the non-linear content identifier request to retrieve the linear content metadata. If the non-linear content identifier request includes the linear content identifier, the matching module 506 may request that the database module 504 retrieve and forward the linear content metadata associated with the linear content identifier from the database 508. Otherwise, the matching module 506 may process the linear content metadata included in the non-linear content identifier request.

The matching module 506 may use a matching algorithm to identify a relationship between at least one metadata keyword and at least one non-linear content keyword. The matching module 506 may apply the matching algorithm to process the linear content metadata to identify metadata keywords, and optionally may remove common words from the metadata keywords. For example, the matching module 506 may remove common words such as "to," "for," "a," "the," or other words that are unlikely to retrieve a meaningful search result. Also, the matching module 506 may not remove the common words. The matching module 506 also may identify similar metadata keywords that are similar to the metadata keywords associated with the linear content metadata. For example, the matching module 506 may identify synonyms, words having common letter and/or number sequences, etc., or other relationships with the metadata keyword. The matching module 506 may include the similar metadata keywords as metadata keywords. The matching module 506 may instruct the database module 504 to search the database 508 based on a relationship between at least one non-linear content keyword and at least one metadata keyword. The search may identify any complete matches and/or any partial matches between at least one non-linear content keyword and the at least one metadata keyword.

Upon completion of the search, the database module 504 may forward a query response to the matching module 506. The query response may include relationship data that indicates if there are any partial or complete matches between at least one metadata keyword and at least one non-linear content keyword. The query response also may include the bid amount and non-linear content identifiers associated with each of the partial and/or complete matching non-linear content keywords. A partial match may be a match of a certain number of characters in the same order in both at least one metadata keyword and at least one non-linear content keyword. The partial match also may include a match of a certain number of characters between similar metadata keywords (e.g., synonyms) and at least one non-linear content keyword. In an exemplary embodiment, multiple advertisers may bid on the non-linear content keywords "doghouse," "cat," and "scissors." The linear content metadata may include the metadata keywords in the sentence: "Bob's demonstrates his new dog sheering scissors." The relationship data may identify a partial match for the non-linear content keyword "doghouse," and a complete match for the word "scissors."

After the relationship data is generated, the matching module 506 may filter the matching non-linear content keywords based on filter parameters to eliminate matches that are not appropriate. Filter parameters such as, but not limited to, a location (e.g., zip code), time of day, linear content rating (e.g., General, Parental Guidance, Restricted, etc.), etc., may be used. For example, a local dairy that sells organic eggs and milk could bid on the non-linear content keywords "organic," "fitness," and "health," and the ratings "TV-PG" and "TV-G", in order to have the local dairy's non-linear content advertisement appear on an advertising display graphical user interface within all non-adult programs (e.g., appropriate for children) that have the one or more of the metadata keywords "organic," "fitness," and "health" within the linear content metadata.

The matching module 506 may then rank the non-linear content identifiers associated with the filtered matching non-linear content keywords based on the bid amount. The matching module 506 may generate rank data indicating a ranking of the non-linear content identifiers relative to one another. To determine the highest bid, the matching module 506 may create a metadata index from the linear content metadata. The metadata index may aggregate linear content metadata keywords that the advertisers have bid on, and may sort the non-linear content identifiers relative to one another based on bids amounts associated with the respective advertisers. The metadata index may be used to preempt a non-linear content identifiers associated with a lower bidder when a non-linear content identifier associated with a higher bidder is received. For example, a first advertiser may bid $0.05 per click on a non-linear content keyword "cookbook" and may have a website as a non-linear content identifier. A second advertiser may bid $0.04 per click on the keyword "cookbook" and also may have a website as a non-linear content identifier. The non-linear content identifier of the first advertiser may be ranked above the non-linear content identifier of the second advertiser. For example, the rank data may indicate that a non-linear content identifier field of a first advertiser is placed at a more visible location as compared with a non-linear content identifier field of a second advertiser.

Once the rank data is determined, the matching module 506 may generate and instruct the communication module 502 to send to the client device 106 a non-linear content identifier response including the filtered matching non-linear content keyword(s), the rank data, and non-linear content identifiers associated with the matching non-linear content keyword(s). The matching module 506 also may send to the non-linear content server 136 a rank message including the rank data to update the address table 300. The non-linear content server 136 may use the rank data to send a notification message to notify the advertiser about a change in ranking of the advertiser's bid amount for one or more non-linear content keywords.

The client device 106 may process the non-linear content identifier response and may indicate to the viewer in a guide display graphical user interface that non-linear content is available for the linear content. After selecting to view particular linear content, the viewer may select a guide display button 1002 on the input device 134 to generate and send a guide display request signal to the client device 106. The client device 106 may process the guide display request signal to cause the display device 104 to display a guide display graphical user interface.

Figure 6:
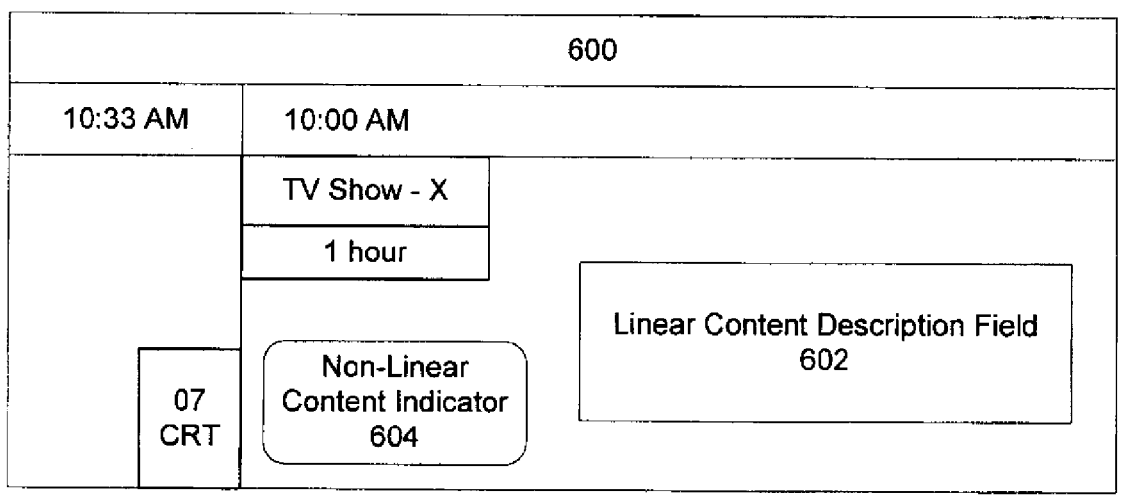
FIG. 6 illustrates a guide display graphical user interface in accordance with exemplary embodiments of the present disclosure.

FIG. 6 illustrates a guide display graphical user interface in accordance with exemplary embodiments of the present disclosure. The guide display graphical user interface 600 may display to the viewer various information associated with the linear content. The guide display graphical user interface 600 may display a current time, a start time for the linear content broadcast, call letters of the company broadcasting the linear content, a channel of the broadcast, a name of the linear content, a length of the linear content broadcast, etc. Other information also may be included. For example, the current time may be 10:33 AM, the start time may be 10:00 AM, the call letters of the broadcaster may be "CRT," the channel of the broadcast may be "7," the name of the linear content may be "TV Show—X," and the length of the linear content broadcast may be one hour.

The guide display graphical user interface 600 also may include a linear content description field 602 and a non-linear content available field 604. The linear content description field 602 may display the linear content metadata to the viewer. For example, the linear content metadata may provide a synopsis of the linear content being broadcast. In a further example, the linear content metadata may be "Environment conducive to losing weight; health and nutrition; instilling good eating habits in children." The non-linear content indicator 604 may optionally be displayed in the guide display graphical user interface 600. Display of the non-linear content indicator 604 may indicate that non-linear content is available for the linear content. The viewer may depress an advertising display graphical user interface key 1012 to instruct the input device 134 to generate and send an advertising display request signal to the client device 106. In response to receiving the advertising display request signal, the client device 106 may generate and send an advertising display graphical user interface signal to cause the display device 104 to display an advertising display graphical user interface.

Figure 7:
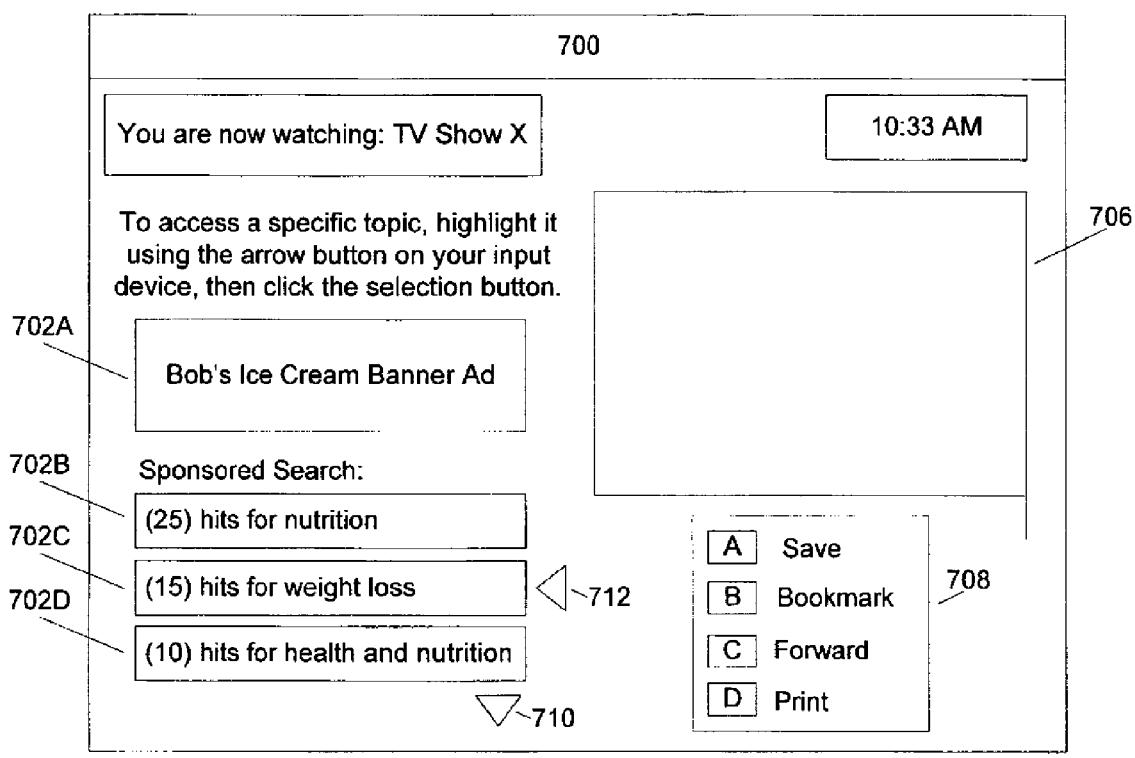
FIG. 7 illustrates an advertising display graphical user interface in accordance with exemplary embodiments of the present disclosure.

FIG. 7 illustrates an advertising display graphical user interface in accordance with exemplary embodiments of the present disclosure. When the client device 106 receives the advertising display graphical user interface signal from the input device 134, the client device 106 may resize the linear content being broadcast to a smaller viewing window 706 within the advertising display graphical user interface 700. The advertising display graphical user interface 700 also may display to the viewer various information associated with the linear content. The advertising display graphical user interface 700 may display a current time and a name of the linear content.

The advertising display graphical user interface 700 may present one or more non-linear content identifier fields 702 in an order specified in the rank data, which may be based on the advertiser's bid amount, with more detailed non-linear content identifier fields available through a sub level display. When the client device 106 receives the non-linear content identifier response from the data center server 136, the client device 106 may process the non-linear content identifier response to identify the rank data. The client device 106 may use the ranking of the non-linear content identifiers to determine in what order to place non-linear content identifiers fields in the advertising display graphical user interface 700. The client device 106 also may display the non-linear content identifier field in other graphical user interfaces (e.g., in a Program Information Bar or in other areas of an Interactive Programming Guide such as, but not limited to, a Program Guide, etc.).

In an exemplary embodiment, the advertiser with the highest bid amount may have a featured non-linear content identifier field 702A and one or more results non-linear content identifier fields 702B-D. The non-linear content identifier associated with the highest bid may be included in the sponsor non-linear content identifier field 702A. The featured non-linear content identifier field 702 also may be placed at other locations, such as being placed at the top of a list of multiple non-linear content identifier fields The results non-linear content identifier fields 702B-D may identify a number of hits (i.e., number of non-linear content identifiers associated with a particular non-linear content keyword) and may display the non-linear content keyword. The non-linear content identifier fields 702 also may be part of a non-linear content advertising display where advertisements are placed according to other business models like the Advertising Lineup concept, where advertising is sold more traditionally through linear content schedules.

The non-linear content identifier fields 702 may include text and/or one or more graphics. For example, a non-linear content identifier field may include the text "Bob's Ice Cream" in a banner advertisement and also may include a graphic depicting an ice cream cone. In a further example, the non-linear content identifier field may be banner advertisement for a video that includes a link for retrieving the video.

The viewer, using the input device 134, may navigate through the advertising display graphical user interface 700 to select one or more of the displayed non-linear content identifier fields 702. The viewer may depress one or more navigation keys 1004 on the input device 134 to generate navigation signals instructing the client device 106 to navigate between the various non-linear content identifier fields 702. The one or more navigation buttons 1304 may be arrow keys for scrolling through and highlighting various fields of the advertising display graphical user interface 700. The client device 106 may update the advertising display graphical user interface 700 with a navigation identifier 712 to indicate which non-linear content identifier field 702 the viewer has highlighted. The advertising display graphical user interface 700 also may include a scroll bar 710 to scroll to non-linear content identifier fields 702 that are not currently being displayed in the advertising display graphical user interface 700.

Once highlighted, the viewer may depress the selection key 1006 to instruct the input device 134 to generate and send to the client device 106 a selection request signal to select one of the non-linear content identifier fields 702. The non-linear content identifier fields 702 may be associated with non-linear content identifiers. Selecting the sponsor non-linear content identifier field 702A may cause the client device 106 to generate and send to the non-linear content server 130 a non-linear content request including the non-linear content identifier associated with the sponsor non-linear content identifier field 702A. For example, the client device 106 may send a Hypertext Transfer Protocol (HTTP) request to the non-linear content server 130 to request the non-linear content advertisement. The non-linear content request may request retrieval of the non-linear content associated with the non-linear content identifier of the sponsor non-linear content identifier field 702A.

In response, the non-linear content server 130 may generate and send to the client device 106 a non-linear content response containing the non-linear content associated with the non-linear content identifier. The non-linear content server 130 also may track the location data, the time slot, and other information about the viewer to inform the advertiser about which customers may be interested in the advertiser's products and/or services. The client device 106 may include location data, the time slot, and other information in the non-linear content request, or the non-linear content server 130 may query the data center server 136 for this information. The client device 106 may receive and process the non-linear content to cause the display device 104 to display the non-linear content. The client device 106 may cause the display device 104 to display the non-linear content full screen or within the viewing window 706.

It is noted that the client device 106 may cause the display device 104 to display the advertising display graphical user interface 700 without the client device 106 being tuned to a particular channel to view linear content being broadcast. The viewer may depress the display graphical user interface key 1012 to instruct the client device 106 to cause the display device 104 to display the advertising display graphical user interface 700. The client device 106 may send a non-linear content identifier request including location data to the data center server 136. In response, the data center server 136 may send a non-linear content identifier response including non-linear content identifiers associated with the location data. The client device 106 may process the non-linear content identifier response to display non-linear content identifier fields 702 in the advertising display graphical user interface

700. The viewer, using the input device 134, may navigate through the advertising display graphical user interface 700 to select the non-linear content identifier fields, as described above. This feature may be a more suitable addition for local advertisers. Selecting one of the results non-linear content identifier fields 702B-D may instruct the client device 106 to generate a sublevel results display graphical user interface.

Figure 8:
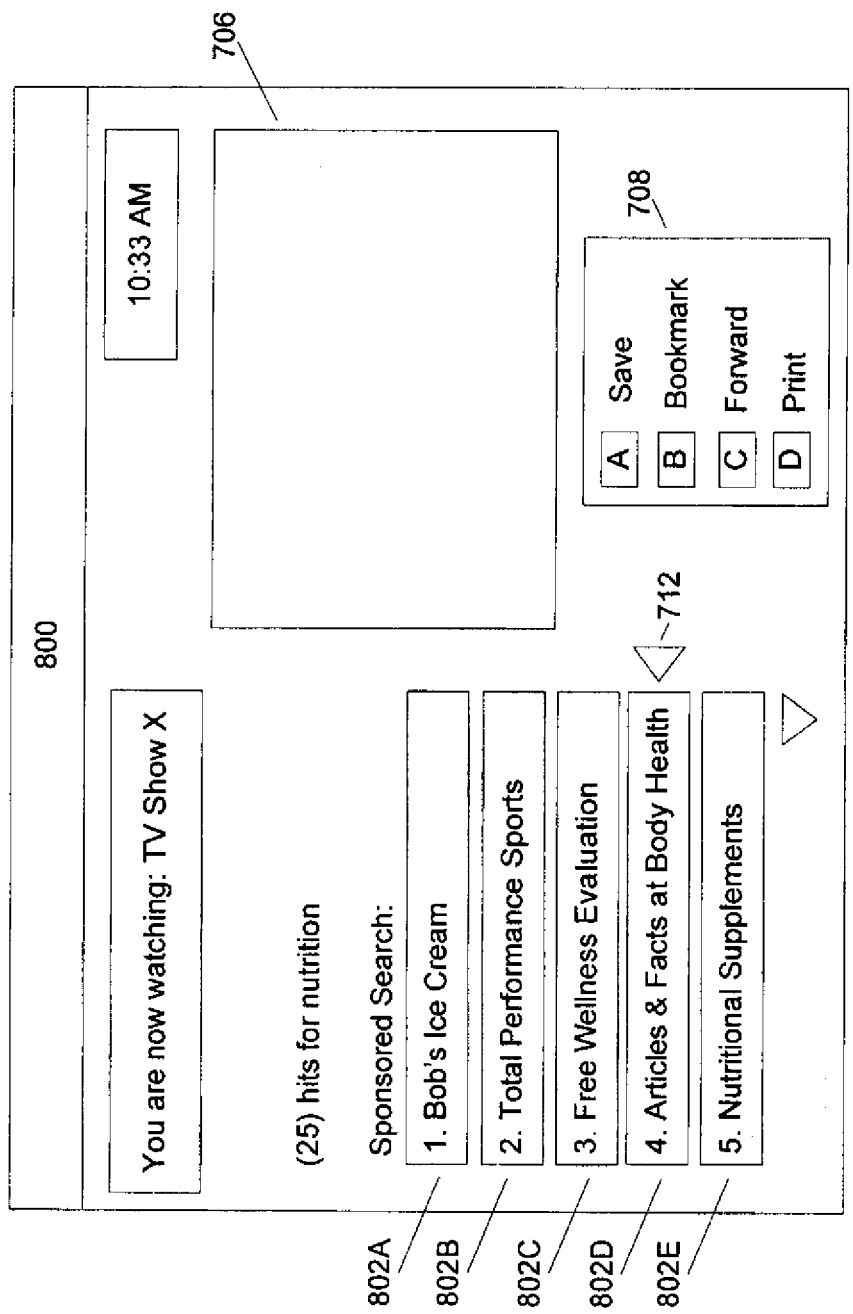
FIG. 8 illustrates a results display graphical user interface in accordance with exemplary embodiments of the present disclosure.

FIG. 8 illustrates a results display graphical user interface in accordance with exemplary embodiments of the present disclosure. The results display graphical user interface 800 may display search results based on a search performed using the metadata keywords of the linear content metadata. The client device 106 may generate the results display graphical user interface 800 based on information included in the non-linear content identifier response received from the data center server 136. The results display graphical user interface 800 may display the number of hits (i.e., the number of non-linear content identifiers included in the non-linear content identifier response for a particular non-linear content keyword) and the selected non-linear content keyword from the results non-linear content identifier fields 702B-D. The results display graphical user interface 800 also may display sponsor non-linear content identifier fields 802A-802E. Each of the sponsor non-linear content identifier fields 802A-802E may be associated with a non-linear content identifier. The sponsor non-linear content identifier fields 802A-802E may include text and/or graphics to describe the associated non-linear content. The client device 106 may display the sponsor non-linear content identifier fields 802A-802E in a ranked order based on the bid amount submitted by each of the advertisers for various non-linear content keywords. The non-linear content identifier field 802 associated with the highest bid amount may be presented at the top of the list, followed by the next highest bid amount, and so forth.

The viewer may use the navigation keys 1004 to move the navigation identifier 712 to highlight a desired sponsor non-linear content identifier field 802. The viewer may select the selection key 1006 to instruct the input device 134 to generate and send a selection request signal. The client device 106 may receive the selection request signal and may generate and send a non-linear content request including the non-linear content identifier associated with the selected non-linear content identifier field 802. The non-linear content server 130 may respond to the non-linear content request by communicating to the client device 106 a non-linear content response including the requested non-linear content. The client device 106 may cause the display device 104 to display the non-linear content full screen or within the viewing window 706 of the results display graphical user interface 800.

Once the non-linear content is completed or the viewer selects to end the non-linear content using the exit key 1010, the client device 106 may cause the display device 104 to display the linear content previously being viewed. The client device 106 may use a digital video recording technology to return the viewer to the location where the viewer exited the linear content broadcast to view the non-linear content, or may display the live broadcast of the linear content. Thus, the client device 106 may retrieve non-linear content during the linear content broadcast, or may retrieve the non-linear content at a later time based on a recording and later viewing of the linear content. Advertisers may update their non-linear content in the interim between when the viewer records the linear content and actually views the linear content. The client device 106 may use a data communication session to retrieve the updated non-linear content at the time when the viewer watches the stored linear content, as opposed to locally storing a static copy of the non-linear content when the linear content is recorded. Thus, advertisers may provide relevant and updated non-linear content based on when the viewer watches the linear content, as opposed to when the viewer records the linear content.

The results display graphical user interface 800 also may include a command field 708. The command field 708 may be a soft key control panel, for example. The viewer may depress soft keys 1008 (e.g., A, B, C, D, etc.) on the input device 134 to select the appropriate command from the command field 708. Upon highlighting a particular sponsor non-linear content identifier field 802, the viewer may depress one of the soft keys 1008 on the input device 134 to generate an output signal encoded based on the selected soft key 1008 to instruct the client device 106 to perform the associated command from the command field 708. The command field 708 may permit the viewer, using the input device 134 to save a non-linear content identifier, to set a reminder for a stored non-linear content identifier, to forward a non-linear content identifier, and/or to print non-linear content.

In response to a bookmark command, the client device 106 may store the non-linear content identifier associated with the selected non-linear content identifier field 802. The client device 106 may use the stored non-linear content identifier to retrieve the non-linear content at a later time. The client device 106 also may retrieve and locally store the non-linear content. For example, the client device 106 may store a long non-linear advertisement in a favorites list where the viewer can later watch the non-linear advertisement without having to remotely retrieve the long non-linear advertisement.

In response to a remind command, the client device 106 may store the non-linear content identifier associated with the selected non-linear content identifier field 802 and a time. The stored time may be used to indicate when to display a visual reminder to remind the viewer about the stored non-linear content identifier. For example, the visual reminder may be a pop-up reminder display that is overlayed over a video signal that appears at the end of a television program. The reminder also may be based on a termination identifier associated with the linear content. The linear content may include a termination identifier at the end of the linear content to signal that the linear content has ended. The client device 106 may search for any stored reminders when the termination identifier is received.

In response to a forward command, the client device 106 may forward the non-linear content identifier to another client device at a different subscriber location. The client device 106 may send a message (e.g., an email, etc.) containing the non-linear content identifier to the other client device to permit the other client device to retrieve the non-linear content identifier. For example, a viewer may identify an advertisement of interest to a friend, and may instruct the client device 106 to forward the advertisement to the friend's client device at a different subscriber location.

In response to a selection request including a print command, the client device 106 may send a print command to an attached or network printer to print a screen shoot of the display.

Figure 9:
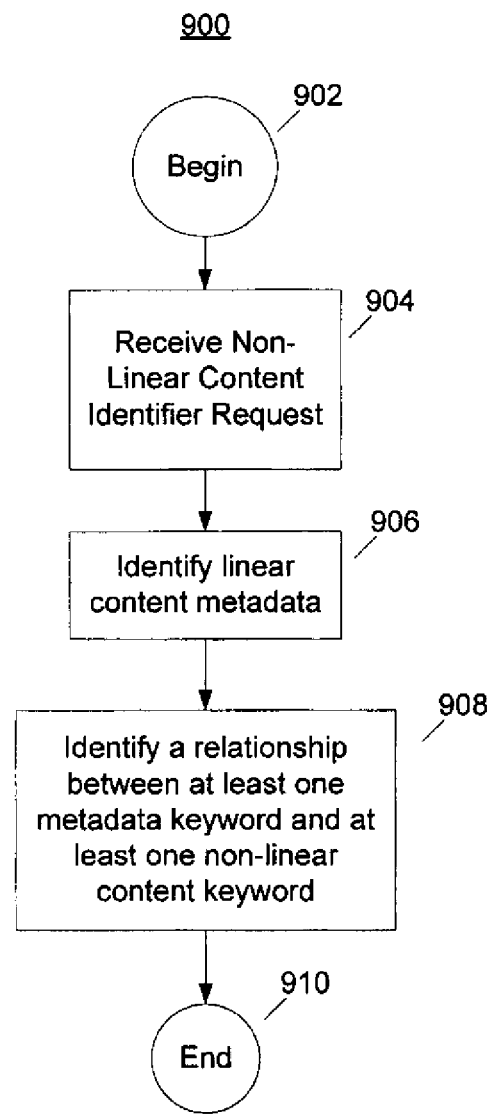
FIG. 9 illustrates a flow diagram of a method in accordance with exemplary embodiments of the present disclosure.

FIG. 9 illustrates a flow diagram of a method in accordance with exemplary embodiments of the present disclosure. This exemplary method is provided by way of example, as there are a variety of ways to carry out methods according to the present disclosure. The method shown in FIG. 9 can be executed or otherwise performed by one or a combination of various systems. The method is described below as carried out by the system 100 shown in FIG. 1 by way of example, and various elements of the system 100 are referenced in explaining the example method of FIG. 9. Each block shown in FIG. 9 represents one or more processes, methods or subroutines carried in the exemplary method. Referring to FIG. 9, in 902, the exemplary flow diagram 900 begins and may continue to 904.

In 904, the method may include receiving a non-linear content identifier request. In an exemplary embodiment, the viewer may use the input device 134 to communicate a selection request signal to the client device 106 selecting to view a particular linear content. In response, the client device 106 may display the selected linear content and may generate and send to the data center server 136 a non-linear content identifier request including the linear content identifier via a data communication session. The flow diagram 900 may continue to 906.

In 906, the method may include identifying linear content metadata based on the non-linear content identifier request, the linear content metadata representing at least one metadata keyword. In an exemplary embodiment, the data center server 136 may retrieve linear content metadata associated with the linear content identifier and may identify metadata keywords of the linear content metadata. The flow diagram 900 may continue to 908.

In 908, the method may include identifying a relationship between a metadata keyword and a non-linear content keyword. In an exemplary embodiment, the data center server 136 may search for a relationship between a non-linear content keywords and a metadata keyword. For example, a matching module 506 instruct the database module 504 to search the database 508 for partial matches, complete matches, and partial and/or complete matches with synonyms between a metadata keyword and a non-linear content keyword. The flow diagram 900 may continue to 910 and end.

The following describes an example of identifying a relationship between at least one metadata keyword and at least one non-linear content keyword to identify and display non-linear content identifier fields to the viewer in accordance with exemplary embodiments of the present disclosure. In an exemplary embodiment, the viewer, using the input device 134, may instruct the client device 106 to tune to a particular television channel to cause display of broadcast linear content at the display device 104. The client device 106 may communicate a non-linear content identifier request including a linear content identifier of the selected linear content to the data center server 136. The data center server 136 may receive and process the non-linear content identifier request to determine whether any non-linear content associated with the broadcast linear content is available. The non-linear content identifier may include location data including zip code 01234 and/or an exact address of the subscriber location 102.

The data center server 136 may retrieve linear content metadata based on the linear content identifier, and may search the database 508 for a relationship between at least one metadata keyword associated with the linear content metadata and at least one non-linear content keyword bid on by one or more advertisers. In this instance, the data center server 136 identifies complete matches for the non-linear content keywords "truck" and "used." A first advertiser, a second advertiser, and a third advertiser each have submitted bids on the non-linear content keyword phrase "used truck." The first advertiser has specified a zip code of 01234 as the location data and a bid amount of $0.06, a second advertiser has specified a zip code of 55125 and a bid amount of $0.04, and a third advertiser has specified a zip code of 01234 as the location data and a bid amount of $0.02. The data center server 136 may filter the matching non-linear content keywords based on location data to eliminate the second advertiser because the viewer's zip code of 01234 does not match the advertiser's zip code of 55125. Thus, the data center server 136 may not send in the non-linear content identifier response a non-linear content identifier associated with the second advertiser.

The data center server 136 then may generate rank data for the non-linear content identifiers of the first and third advertisers. Because the first advertiser has submitted a higher bid amount than the third advertiser's, the rank data may rank the non-linear content identifier of the first advertiser above the rank of the non-linear content identifier of the third advertiser. The data center server 136 may generate and send a non-linear content identifier response to the client device 106. The non-linear content identifier response may include the rank data, the matching non-linear content keyword phrase of "used truck," and the non-linear content identifiers of both the first and third advertisers.

The client device 106 may receive and may process the non-linear content identifier response. When the viewer uses the input device 134 to generate the display graphical user interface signal, in response, the client device 106 may cause the display device 104 to display the advertising display graphical user interface 700. In this example, the advertising display graphical user interface 700 displays non-linear content identifier fields 702 in a list. Because the bid amount for the first advertiser is greater, the advertising display graphical user interface 700 displays the non-linear content identifier field 702 associated with the non-linear content identifier of the first advertiser at the top of the list. The non-linear content identifier field 702 associated with the third advertiser is displayed beneath the non-linear content identifier field 702 associated with the first advertiser. In this example, the viewer may use the navigation keys 1004 of the input device 134 to navigate to the non-linear content identifier field 702 associated with the first advertiser. The viewer may use the input device 134 to generate a selection request signal to select the non-linear content identifier field 702 associated with the first advertiser.

In response, the client device 106 may generate and send to the non-linear content server 130 a non-linear content request including the non-linear content identifier associated with the selected non-linear content identifier field non-linear content identifier request. The non-linear content server 130 may use the non-linear content identifier to retrieve the non-linear content of the first advertiser. In this example, the non-linear content is a 10 minute video on a used truck dealership with videos illustrating the truck models in stock. The non-linear content server 130 may generate and send to the client device 106 a non-linear content response including the non-linear content. The client device 106 may process the non-linear content response and may cause the display device 104 to display the 10 minute video. The video may be displayed full screen or may be displayed within the advertising display graphical user interface 700. Once the non-linear content video is completed, the client device 106 may cause the display device 104 to display linear content buffered at the location where the viewer left off or live linear content as received from the content provider 126.

It is noted that the above description has been provided describing the client device 106 being used at a fixed subscriber location 106. The client device 106 also may be used in other systems. In an exemplary embodiment, the client device 106, the display device 104, and the input device 134 may be implemented at a single computing device, which may be, for example, a mobile phone, a mobile computing device, a personal digital assistant, etc. In such an embodiment, the single computing device, instead of communicating with the central office 110, may communicate with wireless network to access the linear content and the non-linear content.

In exemplary embodiments of the present disclosure, by using a Pay Per Click Advertising model, advertisers only pay when a viewer accesses an advertisement by hitting a designated key on the input device. As a result, advertisers are only paying for exposure to interested customers and not everyone who is watching the broadcast linear content. This advertising model may give advertisers a better sense of how many viewers are actually watching their advertisements and can permit advertisers to adjust their advertising dollars accordingly.

In addition, the system in accordance with exemplary embodiments of the present disclosure may provide an advertising model that may be used to sell to smaller advertisers (e.g., local, regional, niche specific, etc.). This advertising model may be especially appealing to smaller advertisers, who may use the linear content metadata to determine insertion of non-linear content advertisements without having a comprehensive knowledge of the daily linear content schedule. The advertisers can identify non-linear content keywords appropriate for their audience and let the matching algorithm in accordance with exemplary embodiments of the present disclosure schedule their non-linear content. This advertising model permits smaller advertisers to have more tailored advertising campaigns without having experts on television programming linear content on staff.

Moreover, the system in accordance with exemplary embodiments of the present disclosure may provide advertisers with a dynamic and real-time advertising model. Advertising using a system in accordance with exemplary embodiments of the present disclosure does not involve the lead time necessary for conventional linear advertisement insertion, which can range from hours to days. Because linear content metadata is a real-time description of the linear content, no lead time is necessary for scheduling, editing, and/or modifying an advertisement. Advertisers may upload non-linear content (e.g., advanced advertisement) into a non-linear content server prior to the linear content broadcast to advertise.

Viewers do not generally like being bombarded with advertisements. However, if advertising is optional, it is acceptable and even desired. The advertising model in accordance with exemplary embodiments of the present disclosure permits the viewer to request the advertising by clicking on a key on the input device to view the non-linear content advertisement. The request nature of this advertising model both ensures that the advertisements are desired by the viewer and gives the advertiser information on the number of views of the non-linear content. This number can easily be correlated against other linear content metrics (e.g., television metrics, etc.) to get a better understanding of the audience. This invention is an opportunity for telecommunications providers to stand out by using its data session architecture (e.g., Internet Protocol architecture) for Pay Per Click advertising.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
receiving, via a communication module, a non-linear content identifier request for non-linear content, wherein the non-linear content identifier request comprises a linear content identifier associated with linear content selected by a viewer and location data associated with the viewer;
identifying, via a matching module, linear content metadata associated with the linear content identifier of the non-linear content identifier request, the linear content metadata representing at least one metadata keyword; and
identifying, via the matching module, a relationship between the at least one metadata keyword and at least one non-linear content keyword bid on by one or more advertisers associated with a time slot.

2. The method of claim 1, further comprising filtering the relationship between the at least one metadata keyword and the at least one non-linear content keyword based on a filtering parameter to generate at least one filtered non-linear content keyword.

3. The method of claim 2, wherein the filtering parameter specifies at least one of a location, a time slot, a date range, and/or a linear content rating.

4. The method of claim 1, wherein the at least one non-linear content keyword comprises at least one of a number sequence, a letter sequence, and a number and letter sequence.

5. The method of claim 1, wherein the relationship identifies a complete match between the at least one metadata keyword and the at least one non-linear content keyword.

6. The method of claim 1, wherein the relationship identifies a partial match between the at least one metadata keyword and the at least one non-linear content keyword.

7. The method of claim 1, further comprising:
identifying a plurality of non-linear content identifiers associated with the at least one non-linear content keyword; and
ranking the plurality of non-linear content identifiers relative to one another.

8. The method of claim 7, wherein the plurality of non-linear content identifiers are ranked based on a bid amount.

9. The method of claim 7, further comprising updating an advertising table based on the ranking of the plurality of non-linear content identifiers.

10. The method of claim 7, further comprising generating a non-linear content identifier response including the at least one non-linear content keyword, the plurality of non-linear content identifiers, and the ranking of the plurality of non-linear content identifiers.

11. The method of claim 10, further comprising:
receiving a non-linear content request including a first non-linear content identifier of the plurality of non-linear content identifiers; and
retrieving non-linear content associated with the first non-linear content identifier.

12. The method of claim 11, further comprising sending a non-linear content response including the non-linear content.

13. The method of claim 1, wherein the linear content metadata comprises a text file that includes the at least one metadata keyword.

14. The method of claim 13, wherein the text file comprises a word description of linear content.

15. The method of claim 1, wherein the metadata keyword comprises a single word.

16. The method of claim 1, wherein the metadata keyword comprises a word phrase.

17. The method of claim 1, further comprising identifying a similar metadata keyword that is similar to the at least one metadata keyword.

18. The method of claim 1, wherein the non-linear content identifier request includes the linear content metadata.

19. The method of claim 1, further comprising identifying at least one of synonyms of the metadata keyword and words having common letter or number sequences with the metadata keyword.

20. The method of claim 1, wherein processing the at least one metadata keyword comprise removing a common metadata keyword.

21. A computer readable media comprising code to perform the acts of the method of claim 1.

22. A system comprising:
a server communicatively coupled to a network, the server to receive a non-linear content identifier request for non-linear content, wherein the non-linear content identifier request comprises a linear content identifier associated with linear content selected by a viewer and location data associated with the viewer, and to identify linear content metadata associated with the linear content identifier of the non-linear content identifier request, the linear content metadata representing at least one metadata keyword, the server further being configured to identify a relationship between the at least one metadata keyword and at least one non-linear content keyword bid on by one or more advertisers associated with a time slot.

23. A system comprising:
an electronic communication module of an electronic data server communicatively coupled to a network, the communication module to receive a non-linear content identifier request for non-linear content, wherein the non-linear content identifier request comprises a linear content identifier associated with linear content selected by a viewer and location data associated with the viewer;
an electronic database module of the data server communicatively coupled to a database;
an electronic matching module of the data server communicatively coupled to the communication module and to the database module, the matching module to identify linear content metadata associated with the linear content identifier of the non-linear content identifier request, the linear content metadata representing at least one metadata keyword, and the matching module to instruct the database module to search the database to identify a relationship between the at least one metadata keyword and at least one non-linear content keyword bid on by one or more advertisers associated with a time slot.

* * * * *